US006067105A

United States Patent [19]
Kim

[11] Patent Number: 6,067,105
[45] Date of Patent: May 23, 2000

[54] MULTI-FOCUSING LASER BEAM RECORDER AND MULTI-FOCUSING METHOD THEREOF

[75] Inventor: Seon Kyoung Kim, Kyungki-do, Rep. of Korea

[73] Assignee: LG Electronics Inc., Seoul, Rep. of Korea

[21] Appl. No.: 08/997,852

[22] Filed: Dec. 24, 1997

[30] Foreign Application Priority Data

Dec. 27, 1996 [KR] Rep. of Korea ............... 96/73513

[51] Int. Cl.[7] .................................................. G11B 7/00
[52] U.S. Cl. .................. 347/256; 347/241; 369/44.11; 369/44.14; 369/44.26
[58] Field of Search ................ 369/44.28, 44.11, 369/44.14, 44.29, 44.37, 112, 44.27, 44.26; 347/241, 256

[56] References Cited

U.S. PATENT DOCUMENTS

| | | | |
|---|---|---|---|
| 5,195,081 | 3/1993 | Usui | 369/112 |
| 5,295,125 | 3/1994 | Oonishi et al. | 369/44.29 |
| 5,623,464 | 4/1997 | Tani | 369/44.28 |
| 5,828,636 | 10/1998 | Matsumoto et al. | 369/44.27 |

*Primary Examiner*—N. Le
*Assistant Examiner*—Hai C. Pham

[57] ABSTRACT

A multi-focusing laser beam recorder and a multi-focusing method includes first and second light sources for generating a Kr laser beam for recording light and an He—Ne laser beam for focusing. A fixed optical system modulates the Kr laser beam for recording light and divides the beam into a main beam and a sub beam on each of different paths. An optical divider divides the main beam or the sub beam incident through a shutter of the fixed optical system and the He—Ne laser beam incident from the second light source. A focus servo focuses either the main beam or the sub beam from the optical divider and the He—Ne laser beam on a predetermined area of the glass substrate. First, second and third position sensor controllers control the focus servo to focus the He—Ne laser beam on the glass substrate in response to the pit width of the glass substrate by sensing the laser beam for focusing reflected upon the glass substrate. In such a multi-focusing laser beam recorder, it is possible to reduce required time and price related to process steps and to enable using the position sensors to cut any pit.

13 Claims, 7 Drawing Sheets

F I G. 9
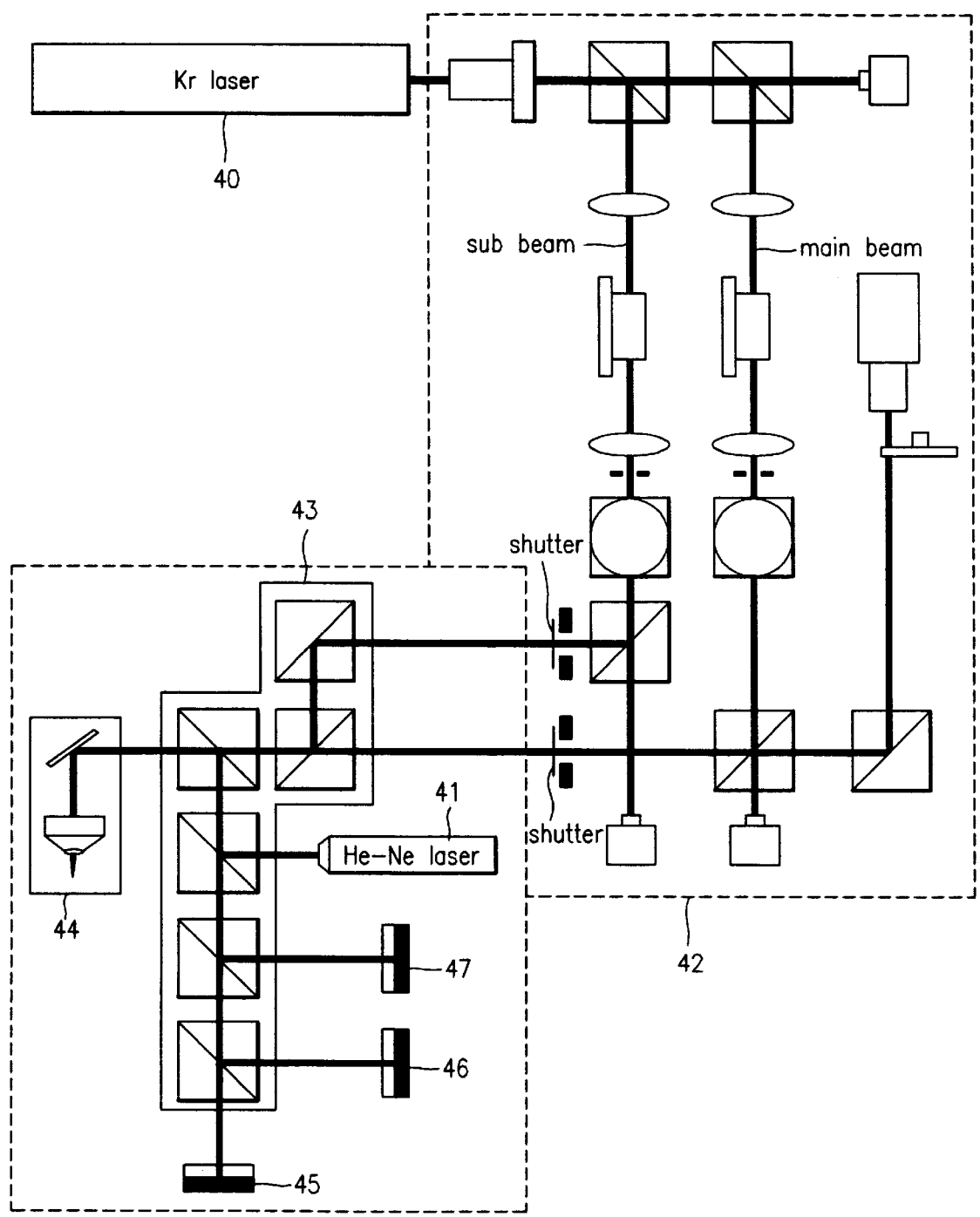

MULTI-FOCUSING LASER BEAM RECORDER AND MULTI-FOCUSING METHOD THEREOF

BACKGROUND OF THE INVENTION

1. Field of the Invention

The present invention relates to a laser beam recorder which applies a signal to an optical disk when fabricating the optical disk and more particularly, to a multi-focusing laser beam recorder and a multi-focusing method thereof.

2. Discussion of the Related Art

Generally, a laser beam recorder sensitizes a photoresist deposited on a glass substrate in response to data to be recorded, when fabricating an optical disk. The laser beam recorder includes a laser light source, an optical modulator for modulating the laser light in response to a signal, an optical system and a focus servo system for focusing the laser light on the photoresist deposited on the glass substrate, and a spindle for rotating the glass substrate.

A focusing method of the laser beam recorder will be described with reference to FIGS. 1 and 2.

FIG. 1 shows a focus system of a laser beam recorder according to the background art. FIG. 2 shows a focus servo system of an object lens of FIG. 1.

As shown in FIG. 1, a krypton (Kr) laser for recording a signal is to be incident upon a glass substrate 1 on which a photoresist is deposited. The incident Kr laser is reflected upon a reflecting mirror 3 through a first optical divider 2. The reflected Kr laser is to be incident upon the glass substrate 1 through an object lens 4. An He—Ne laser for focusing is to be incident upon the reflecting mirror 3 through a second optical divider 5 and the first optical divider 2 sequentially. The He—Ne laser reflected upon the reflecting mirror 3 is focused on the glass substrate 1 where the Kr laser is to be incident through the object lens 4. The He—Ne laser incident upon the glass substrate 1 is reflected again to be incident upon the first optical divider 2. The first optical divider 2 permits only 633 nm wavelength band of the He—Ne laser to be incident upon the second optical divider 5. The He—Ne laser incident upon the second optical divider 5 is to be incident upon a position sensor 6 so that it is converted to an electrical signal.

Since the position sensor 6 is divided into A area and B area, an amount of current from the A area becomes same as that from the B area if the He—Ne laser is to be incident upon the center of the position sensor 6. In this case, the current difference between the A area and the B area becomes zero. It is noted that the He—Ne laser is focused on the glass substrate.

As described in detail, as shown in FIG. 2, the He—Ne laser is to be incident upon the glass substrate 1 at "III" position after passing through the object lens 4 along "I" direction. The He—Ne laser incident upon the glass substrate 1 is then reflected in "III" direction to be incident upon the center of the position sensor 6. The current difference between the A area and the B area in the position sensor 6 is maintained at zero.

However, if the distance between the glass substrate 1 and the object lens 4 is close or far away, the He—Ne laser incident upon the position sensor 6 is moved to the A area or the B area so that the amount of current from the A area or the B area becomes larger.

For example, if the distance between the glass substrate 1 and the object lens 4 is close, i.e., if the glass substrate 1 is disposed at "II" position, the He—Ne laser incident in "I" direction is reflected in "II" direction so that the current difference between the A area and the B area in the position sensor 6 is not maintained at zero.

At this time, an OP amplifier obtains current difference between the A area and the B area in the position sensor 6 and amplifies the current difference so as to flow the current into a solenoid 7 which adjusts the position of the object lens 4.

The solenoid 7 moves the object lens 4 upwardly to maintain the distance between the glass substrate 1 and the object lens 4 at a certain interval.

As discussed above, the laser beam recorder allows focus servo in only one position (one pit width).

Since the size of the laser beam is uniformly set, the laser beam recorders required to fabricate a compact disk (CD) and a digital video disk (DVD) are different from each other. The pit width of the CD is 0.5 $\mu$m approximately and that of the DVD is 0.2 $\mu$m–0.3 $\mu$m approximately. For this reason, the size of the laser beam focused on the glass substrate depends on the CD or the DVD.

In this respect, there is provided a laser beam recorder for use in both the CD and the DVD. This laser beam recorder is divided into a two-beam type and a beam expander type.

FIG. 3 shows a focus system of a beam expander type laser beam recorder for use in both CD and DVD. FIG. 4 shows the size of a beam focused in response to the size of a beam incident upon an object lens. FIG. 5 shows an optical system of a two-beam type laser beam recorder for use in both CD and DVD.

As shown in FIG. 3, the beam expander type laser beam recorder expands a waist portion of a Kr laser beam using a beam expander 10 in order to apply to the DVD. While, the beam expander 10 is removed from the beam expander type laser beam recorder for use in the CD.

As discussed above, if a waist portion ("A" portion in FIG. 4) of the beam to be incident upon the object lens 4 is expanded using the beam expander, a waist portion ("B" portion in FIG. 4) of the beam to be focused becomes smaller relatively.

The two-beam type laser beam recorder includes a sub-beam 21 and a main beam 22 in a fixed optical system 20. The sub-beam 21 is adjusted to be suitable for the size of the CD, while the main beam 22 is adjusted to be suitable for the size of the DVD. These sub and main beams 21 and 22 are transferred to the object lens 4 in a moving optical system 23.

In other words, when the two-beam type laser beam recorder is used for the CD, a shutter in a direction of the sub-beam 21 is opened to pass through only the sub-beam 21. When the two-beam type laser beam recorder is used for the DVD, a shutter in a direction of the main beam 21 is opened to pass through only the main beam 22.

However, the laser beam recorder and a focusing method thereof according to the background art have several problems.

Since the beam expander type laser beam recorder has each of paths of the laser beam when the beam expander is both included and removed, it is necessary to align again the optical system. This increases time consumption in the process steps and causes inconvenience to newly set a mastering condition.

The two-beam type laser beam recorder has good stability of the system but uses optical components doubly. This causes high price in the overall system. In addition, the two-beam type laser beam recorder has a problem that the laser of high power must be used.

SUMMARY OF THE INVENTION

Accordingly, the present invention is directed to a multi-focusing laser beam recorder and a multi-focusing method thereof that substantially obviate one or more of the problems due to limitations and disadvantages of the related art.

An object of the present invention is to provide a multi-focusing laser beam recorder and a multi-focusing method thereof in which a CD, DVD-ROM and DVD-RAM can be fabricated using one laser beam recorder without optics alignment or additional optical system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a multi-focusing laser beam recorder and a multi-focusing method thereof are characterized that a plurality of position sensor controllers control a focus servo to focus a laser beam for focusing on an optical recording medium by sensing the laser beam for focusing reflected upon the optical recording medium.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 9 is a block diagram showing a multi-focusing laser beam recorder for use in a CD, DVD-ROM and DVD-RAM, according to the present invention.

DETAILED DESCRIPTION OF THE PREFERRED EMBODIMENTS

Reference will now be made in detail to the preferred embodiments of the present invention, examples of which are illustrated in the accompanying drawings.

Figure 6:
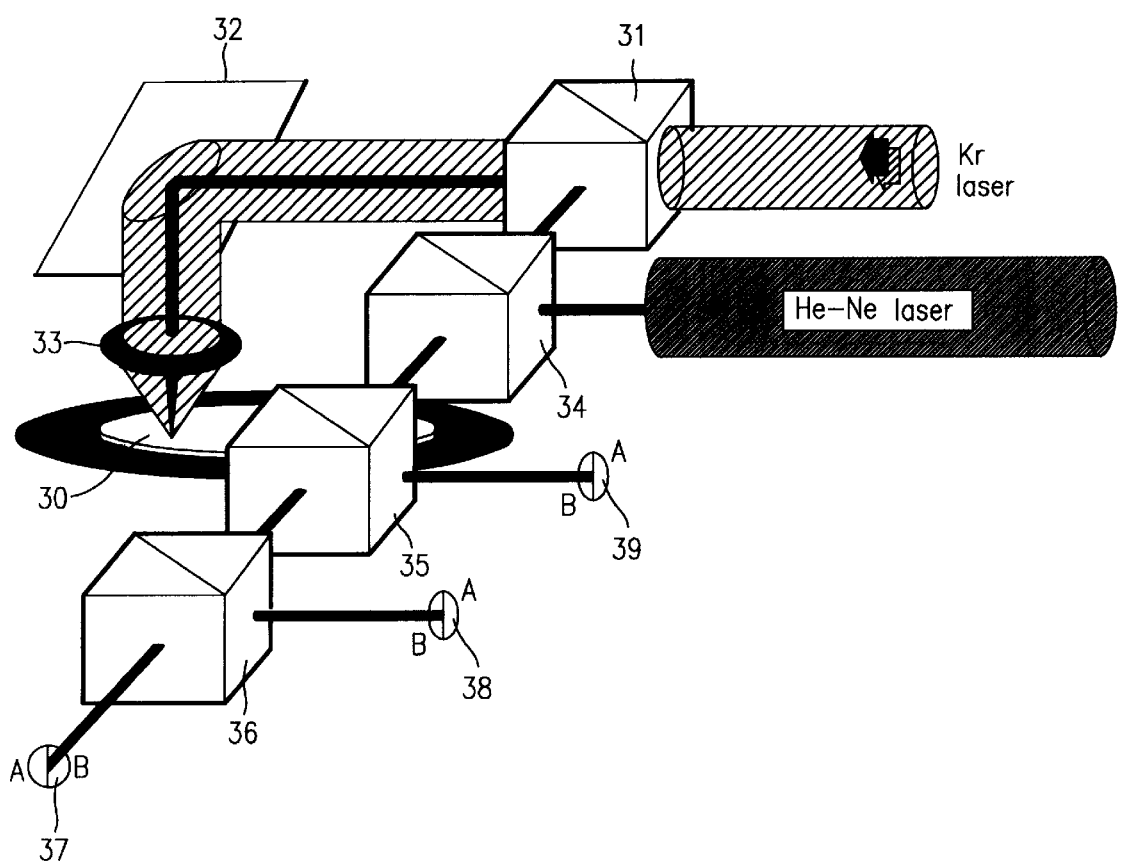
FIG. 6 shows a multi-focus system of a laser beam recorder according to the present invention.

As shown in FIG. 6, in a multi-focus system of the present invention, a Kr laser for recording a signal is to be incident upon a glass substrate 30 on which a photoresist is deposited. The incident Kr laser is reflected upon a reflecting mirror 32 through a first optical divider 31. The reflected Kr laser is to be incident upon the glass substrate 30 through an object lens 33. An He—Ne laser for focusing is to be incident upon the reflecting mirror 32 through a second optical divider 34 and the first optical divider 31 sequentially. The He—Ne laser reflected upon the reflecting mirror 32 is focused on the glass substrate 30 where the Kr laser is to be incident through the object lens 33. The He—Ne laser incident upon the glass substrate 30 is reflected again to be incident upon the first optical divider 31. The first optical divider 31 permits only 633 nm wavelength band of the He—Ne laser to be incident upon the second optical divider 34. The He—Ne laser incident upon the second optical divider 34 is to be incident upon first, second and third position sensors 37, 38 and 39 through third and fourth optical dividers 35 and 36.

The optical dividers 31, 34, 35 and 36 and the first position sensor 37 are disposed on the same line. The second position sensor 38 is disposed on a line perpendicular to the fourth optical divider 36. The third position sensor 39 is disposed on a line perpendicular to the third optical divider 35.

Figure 7:
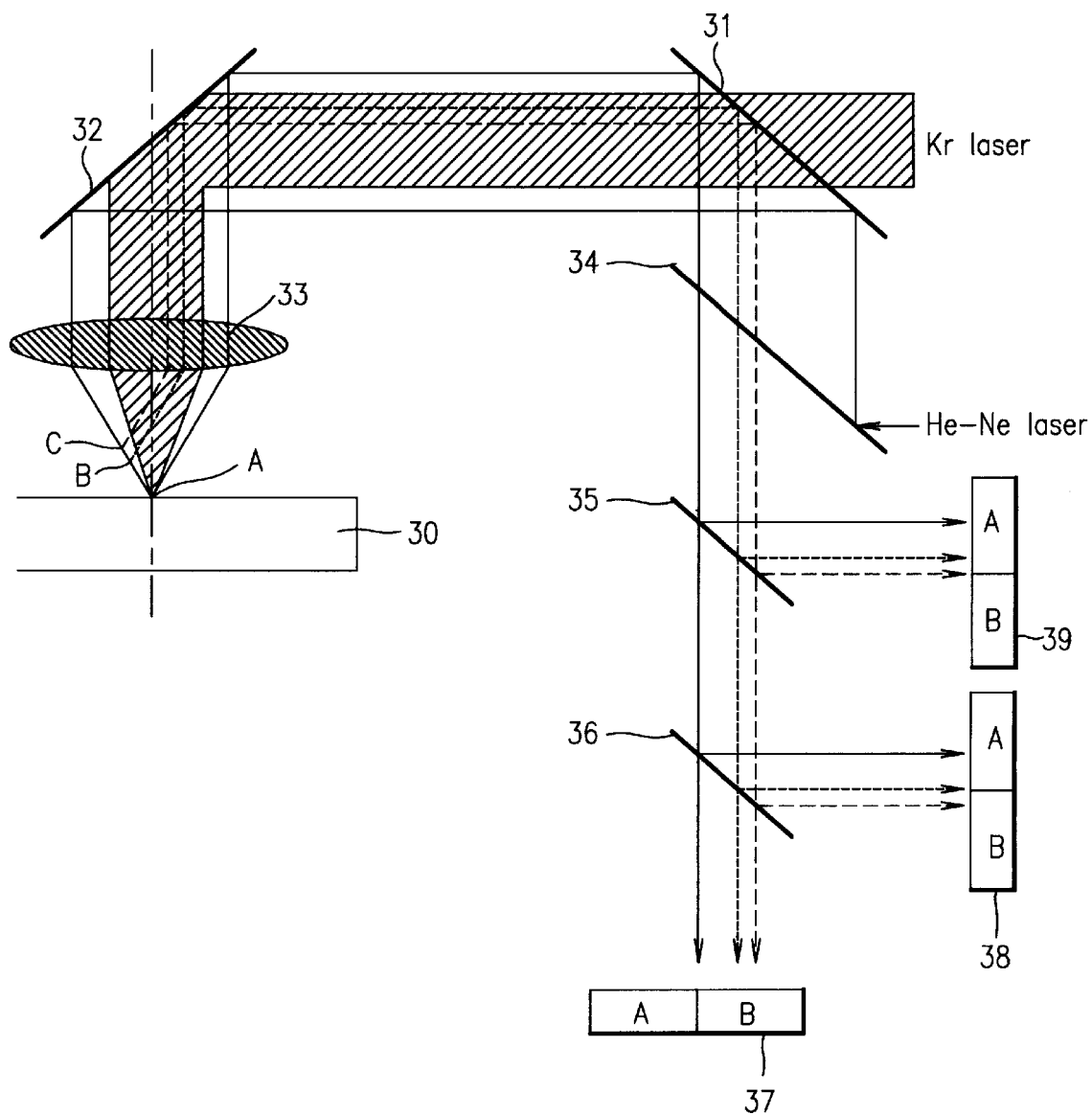
FIG. 7 shows a flow of an He—Ne laser beam for focusing.

The first, second and third position sensors 37, 38 and 39 are respectively divided into "A" area and "B" area as shown in FIG. 7. In this respect, an amount of current from the A area becomes same as that from the B area if the He—Ne laser is to be incident upon the center of each of the position sensors. The current difference between the A area and the B area becomes zero. In this case, it is noted that the Kr laser is focused on the glass substrate.

However, if the distance between the glass substrate 30 and the object lens 33 is close or far away, the He—Ne laser incident upon each of the position sensors 37, 38 and 39 is moved to the A area or the B area so that the amount of current from the A area or the B area becomes larger.

Figure 1:
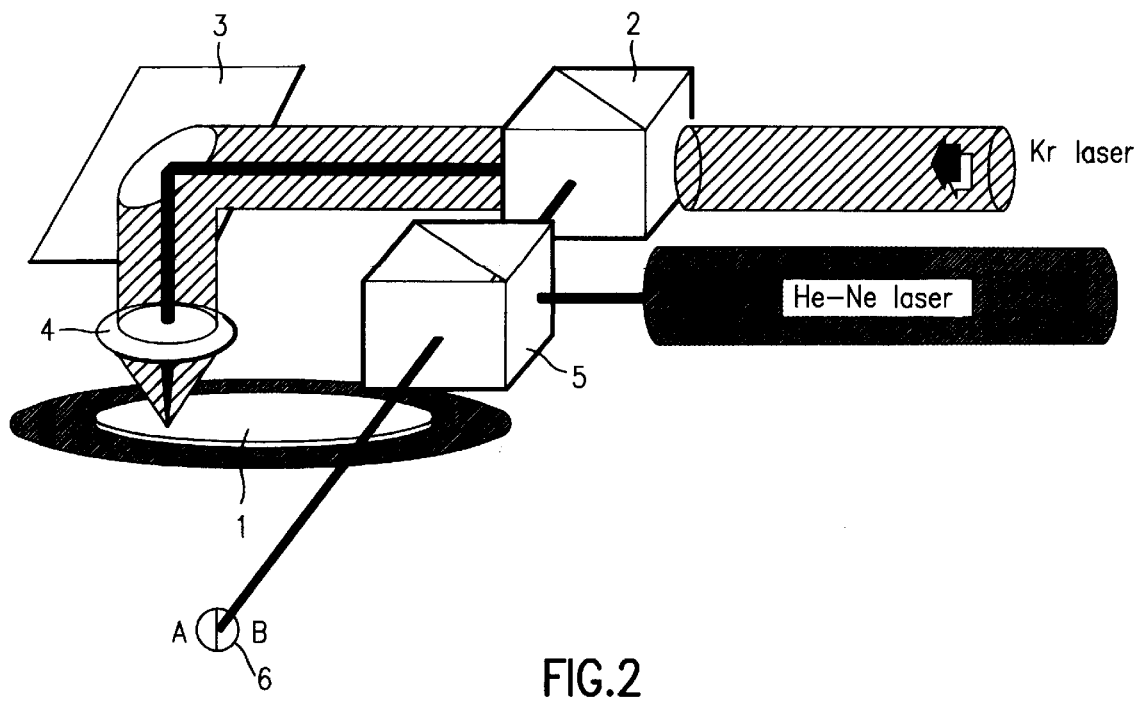
FIG. 1 shows a focus system of a laser beam recorder according to the background art.
Figure 2:
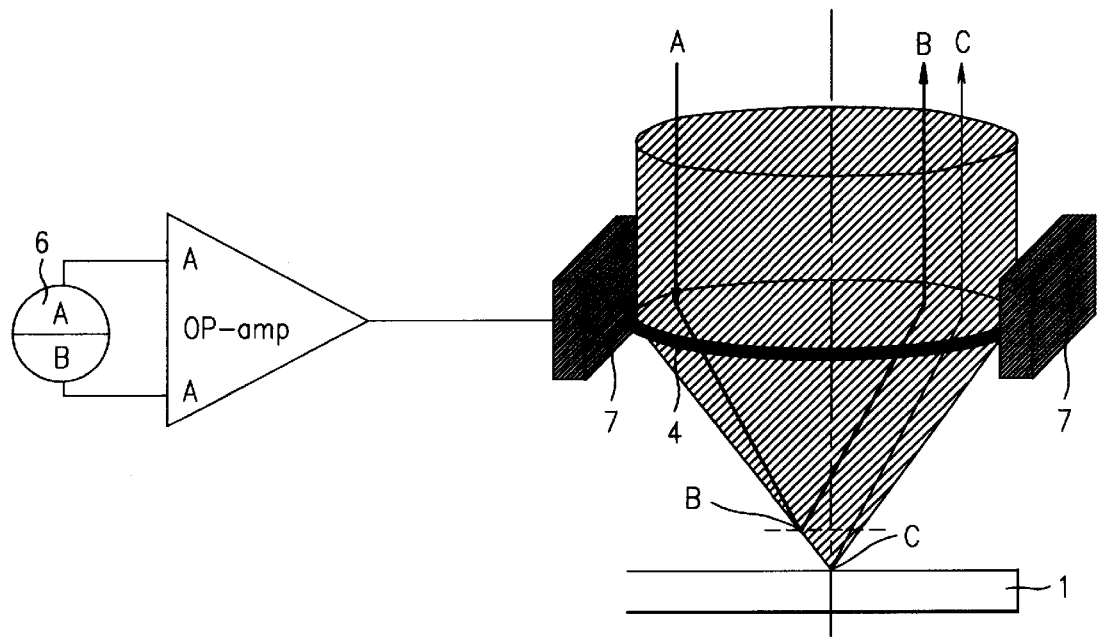
FIG. 2 shows a focus servo system of an object lens of FIG. 1.
Figure 3:
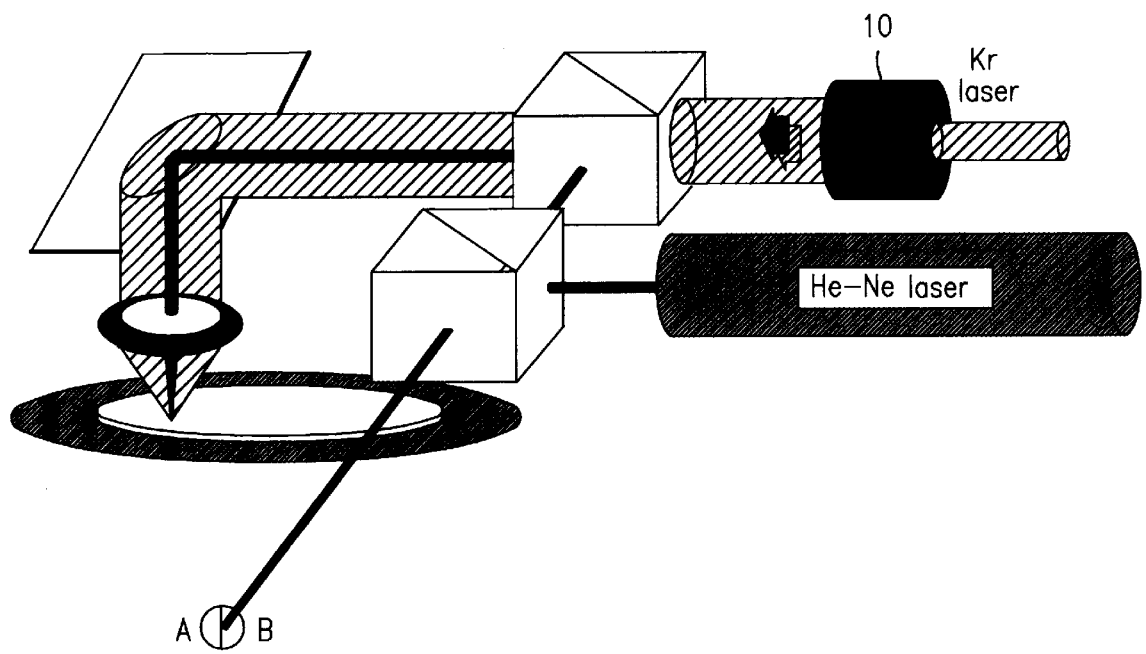
FIG. 3 shows a focus system of a beam expander type laser beam recorder for use in a CD and a DVD.
Figure 4:
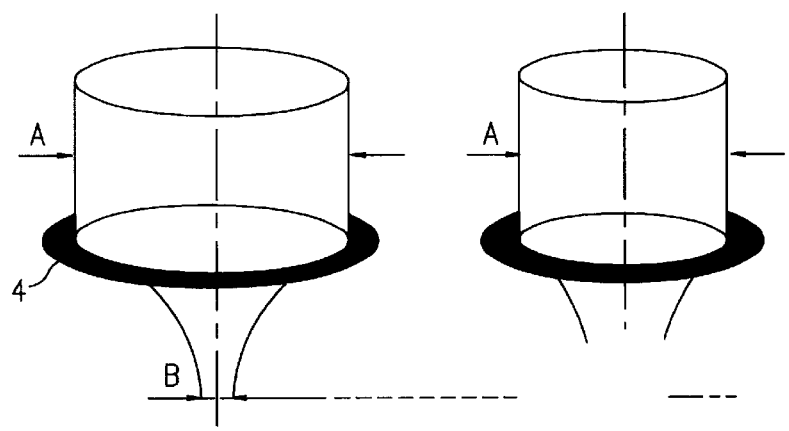
FIG. 4 shows the size of a beam focused depending on the size of a beam incident upon an object lens.
Figure 5:
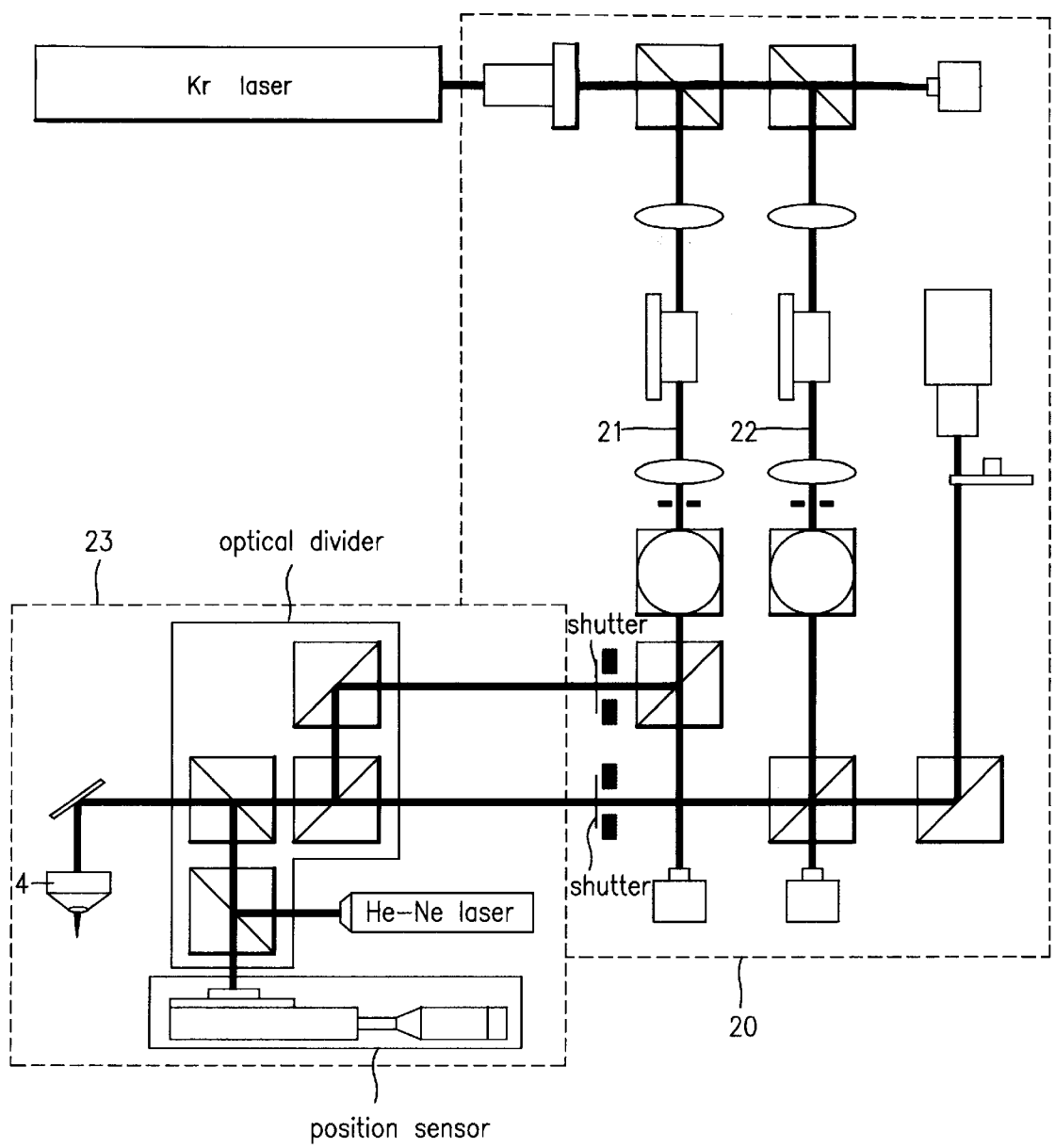
FIG. 5 shows an optical system of a two-beam type laser beam recorder for use in a CD and a DVD.

In that case, an OP amplifier obtains the current difference between the A area and the B area in each of the position sensors 37, 38 and 39 and amplifies the current difference so as to flow the current into a solenoid which adjusts the position of the object lens 33 in the manner as shown in FIG. 2 to focus the object lens 33.

In fabricating a CD, a DVD-ROM and a DVD-RAM using the multi-focusing laser beam recorder according to the present invention, the operation of each of the multi-focusing systems will now be described.

As shown in FIG. 7, if the He—Ne laser beam for focusing is reflected "A" position upon the glass substrate 30, the first position sensor 37 is arranged to sense the beam in the center of the first position sensor 37. If the He—Ne laser beam for focusing is reflected in "B" position upon the glass substrate 30, the second position sensor 38 is arranged to sense the beam in the center of the second position sensor 38. If the He—Ne laser beam for focusing is reflected "C" position upon the glass substrate 30, the third position sensor 39 is arranged to sense the beam in the center of the third position sensor 39.

At this time, at "A" position, the size of the Kr laser beam is 0.2 $\mu$m–0.3 $\mu$m. At "B" position, the size of the Kr laser beam is 0.5 $\mu$m. At "C" position, the size of the Kr laser beam is 0.7 $\mu$m.

Thereafter, to fabricate a CD with a pit width of 0.5 $\mu$m, the He—Ne laser beam for focusing reflected upon the glass substrate 30 is sensed by the second position sensor 38 and the object lens 33 is adjusted to focus the beam on "B"

position. For data recording, the photoresist on the glass substrate 30 is cut with a pit width of 0.5 µm approximately by the Kr laser beam.

At this time, the reason why the photoresist is cut with the pit width of 0.5 µm is that the size of the Kr laser beam in "B" position is 0.5 µm.

Meanwhile, to fabricate a DVD with a pit width of 0.2 µm–0.3 µm, the He—Ne laser beam for focusing reflected upon the glass substrate 30 is sensed by the first position sensor 37 and the object lens 33 is adjusted to focus the beam on "A" position.

Figure 8:
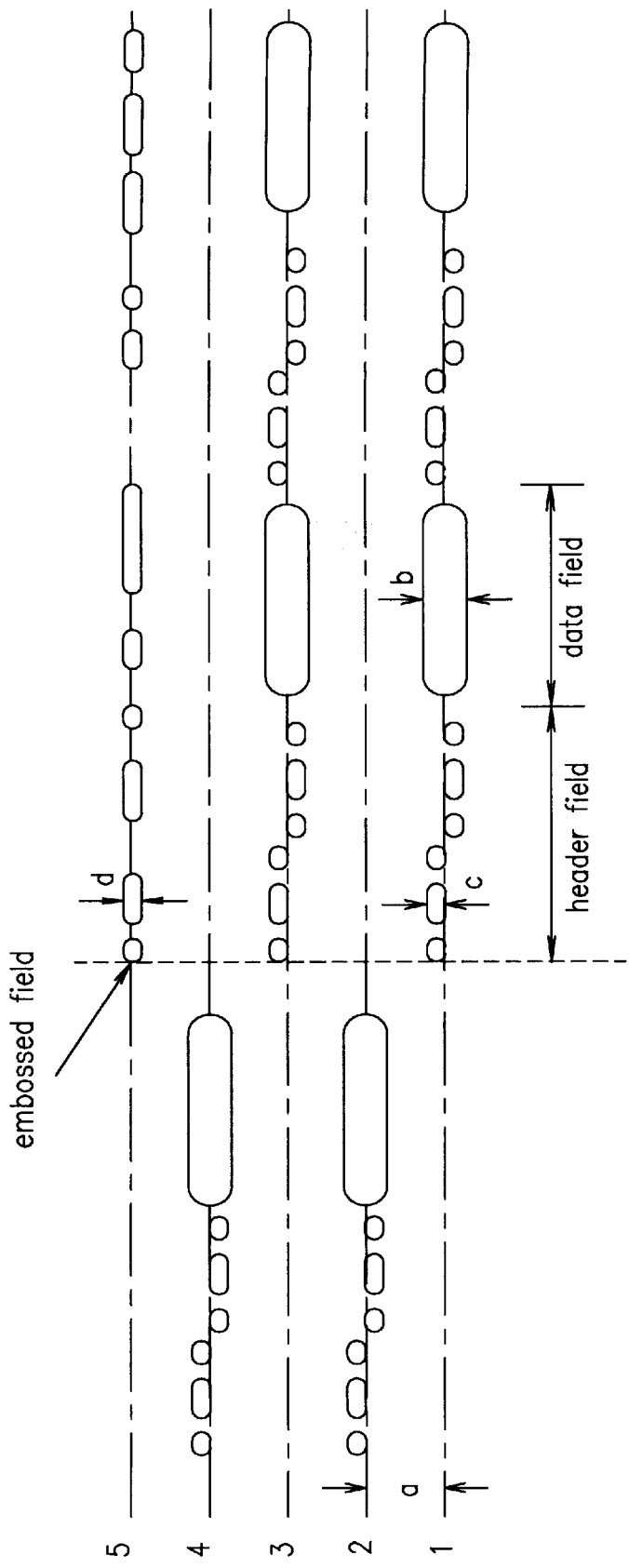
FIG. 8 shows a physical format of a DVD-RAM.

FIG. 8 shows a physical format of a DVD-RAM. As shown in FIG. 8, a first track to a fifth track are paths showing movement of pick-up. At this time, "a" portion between tracks represents a track pitch of the DVD-RAM. The track pitch of the DVD-RAM is 0.74 µm same as that of the DVD-ROM.

The DVD-RAM includes a header field, a data field and an embossed field. The header field is disposed to slightly cross from the track where the pick-up is moved. The data field is disposed near the header field and consists of a land form or a groove form for recording. The embossed field is recorded by disk maker. It is impossible to delete data recorded in the embossed field.

The pit width ("c" portion) of the header field and the pit width ("d" portion") of the embossed field are 0.2 µm–0.3 µm, respectively, in the same manner as that of the DVD-ROM. The pit width ("b" portion) of the data field is 0.7 µm approximately.

For reading, the pick-up is moved from "0" position to right side and continues to read in the second track if reading is completed in the first track. There exists the data field of groove form and the embossed field on the track. One beam cuts the pit on the track and the other beam cuts the header field which is disposed to get out of the track. Therefore, dual beam must be provided for the laser beam recorder for fabricating the DVD-RAM.

FIG. 9 is a block diagram of a multi-focusing laser beam recorder for use in a CD, a DVD-ROM and a DVD-RAM.

As shown in FIG. 9, the multi-focusing laser beam recorder includes first and second light sources 40 and 41 for generating a Kr laser beam for recording light and an He—Ne laser beam for focusing, a fixed optical system 42 for modulating the Kr laser beam for recording light and dividing the beam into a main beam and a sub beam to load these beams on each of different paths, an optical divider 43 for dividing the main beam or the sub beam incident through a shutter of the fixed optical system 42 and the He—Ne laser beam incident from the second light source 41, a focus servo 44 for focusing either the main beam or the sub beam from the optical divider 43 and the He—Ne laser beam on a predetermined area of the glass substrate, and first, second and third position sensor controllers 45, 46 and 47 for controlling the focus servo 44 to focus the He—Ne laser beam on the glass substrate in response to the pit width of the glass substrate by sensing the laser beam for focusing reflected upon the glass substrate.

The main beam is used to cut the data field and the embossed field. The sub beam is used to cut the header field.

It is noted that either the main beam or the sub beam is to be incident upon the glass substrate through the shutter of the fixed optical system 42.

In the focus system for fabricating the DVD-RAM using the laser beam recorder as described above, the main beam is to be incident upon the glass substrate 30 as shown in FIG. 7. The He—Ne laser beam for focusing reflected upon the glass substrate 30 is sensed by the first sensor 37 and the object lens 33 is adjusted to focus the beam on "A" position. Then, the main beam cuts the embossed field with the pit width of 0.2 µm–0.3 µm approximately. The He—Ne laser beam for focusing reflected upon the glass substrate 30 is sensed again by the third position sensor 39 and the object lens 33 is adjusted to focus the beam on "C" position. The data field is cut with the pit width of 0.7 µm.

Meanwhile, the sub beam is to be incident upon the glass substrate 30. The He—Ne laser beam for focusing reflected upon the glass substrate 30 is sensed by the first position sensor 37. The object lens 33 is adjusted to focus the beam on "A" position so that the header field is cut with the pit width of 0.2 µm–0.3 µm approximately.

As discussed above, the present invention provides three position sensors so as to triply focus the laser beam.

In other words, the first position sensor is focused to cut the pit of the DVD-ROM and the embossed field of the DVD-RAM. The second position sensor is focused to cut the pit of the CD. The third position sensor is focused to cut the data field of the DVD-RAM.

The multi-focusing laser beam recorder and the multi-focusing method thereof according to the present invention have the following advantages.

Since the object lens is automatically disposed in response to the size of the beam to be focused on the glass substrate, it is possible to ensure continuous data recording. Since alignment is not required, time consumption is reduced in the process steps.

Since the number of the optical components is reduced, the price caused in the process steps is reduced. Since the size of additional components such as the position sensor is small, it is convenient to upgrade the laser beam recorder according to the background art. Since the position sensor corresponding to the size of each of the beam is set, it is likely to freely move the position sensor to cut any pit.

It will be apparent to those skilled in the art that various modifications and variations can be made in the multi-focusing laser beam recorder and the multi-focusing method thereof according to the present invention without departing from the spirit or scope of the invention. Thus, it is intended that the present invention covers the modifications and variations of the invention provided they come within the scope of the appended claims and their equivalents.

What is claimed is:

1. A multi-focusing laser beam recorder comprising:
   first and second light sources for generating a laser beam for recording and a laser beam for focusing;
   a plurality of optical dividers for dividing the laser beam for recording and the laser beam for focusing;
   a focus servo for focusing the laser beam for recording and the laser beam for focusing from said plurality of optical dividers on a predetermined area of an optical recording medium; and
   a plurality of position sensor controllers for respectively controlling said focus servo to focus the laser beam for focusing on the optical recording medium with respective different beam widths in accordance with pit width of the optical recording medium by sensing the laser beam for focusing reflected from the optical recording medium.

2. The multi-focusing laser beam recorder as claimed in claim 1, wherein said plurality of position sensor controllers include position sensors and amplifiers.

3. The multi-focusing laser beam recorder as claimed in claim 2, wherein the position sensors are respectively arranged so that the reflected laser beams for focusing corresponding to different beam widths are incident on centers of respective position sensors in accordance with the pit width of the optical recording medium.

4. A multi-focusing laser beam recorder comprising:

first and second light sources for generating a laser beam for recording and a laser beam for focusing;

an optical portion for modulating and dividing the laser beam for recording into a main beam and a sub beam on each of different paths;

a focus servo for focusing either the main beam or the sub beam and the laser beam for focusing on a predetermined area of an optical recording medium;

first through fourth optical dividers for providing the laser beam for focusing to said focus servo and for dividing the laser beam for focusing reflected from the optical recording medium; and first, second and third position sensor controllers for respectively controlling said focus servo to focus the laser beam for focusing on the optical recording medium with respective different beam widths in accordance with pit width of the optical recording medium by sensing the reflected laser beam for focusing divided by said first through fourth optical dividers.

5. The multi-focusing laser beam recorder as claimed in claim 4, wherein said first to fourth optical dividers and said first position sensor controller are disposed along a same line.

6. The multi-focusing laser beam recorder as claimed in claim 4, wherein said second position sensor controller is disposed along a line perpendicular to said fourth optical divider, and said third position sensor controller is disposed along a line perpendicular to said third optical divider.

7. The multi-focusing laser beam recorder as claimed in claim 4, wherein said first to third position sensor controllers are respectively arranged so that the reflected laser beams for focusing corresponding to different beam width are incident on centers of respective ones of said first through third position sensor controllers in accordance with the pit width of the optical recording medium.

8. A multi-focusing method of a multi-focusing laser beam recorder having a first light source, a second light source, a reflecting mirror, an object lens, and position sensors, the method comprising the steps of:

dividing a laser beam for recording from the first light source into a main beam and a sub beam on each of different paths;

positioning the main beam or the sub beam on a predetermined area of an optical recording medium through the reflecting mirror and the object lens;

reflecting a laser beam for focusing from the second light source on a position of the laser beam for recording which is disposed on the optical recording medium through the reflecting mirror and the object lens to be incident upon each of the position sensors; and controlling the object lens to focus the laser beam for focusing on the optical recording medium with respective different beam widths in accordance with pit width of the optical recording medium by sensing the reflected laser beam for focusing incident on the position sensors.

9. The multi-focusing method as claimed in claim 8, wherein either the main beam or the sub beam of the laser beam for recording is incident upon the predetermined area of the optical recording medium in response to a characteristic of the optical recording medium.

10. The multi-focusing method as claimed in claim 8, wherein the laser beams for focusing corresponding to different beam widths are respectively incident upon at least one position sensor of the position sensors at centers of left and right sensing areas.

11. The multi-focusing method as claimed in claim 8, wherein the laser beam for focusing is scattered by the optical divider to be incident upon sensing areas of each of the position sensors.

12. A method of multi-focusing laser beam recording comprising the steps of:

a) generating a laser beam for recording and a laser beam for focusing;

b) dividing the laser beam for recording and the laser beam for focusing;

c) focusing the laser beam for recording and the laser beam for focusing divided in said step b) on a predetermined area of an optical recording medium;

d) sensing the laser beam for focusing, reflected from the optical recording medium, with respective different position sensors in accordance with pit width of the optical recording medium; and e) controlling said step c) of focusing the laser beam for focusing on the optical recording medium with respective different beam widths in accordance with the sensed laser beam.

13. The method of multi-focusing laser beam recording of claim 12, wherein said step d) comprises respectively arranging the position sensors so that the reflected laser beams for focusing corresponding to different beam widths are incident on centers of respective position sensors in accordance with the pit width of the optical recording medium.

* * * * *